(No Model.)  2 Sheets—Sheet 1.
F. J. BOLTON.
FLOATING APPARATUS FOR PRODUCING ILLUMINATED FOUNTAINS.
No. 312,958. Patented Feb. 24, 1885.
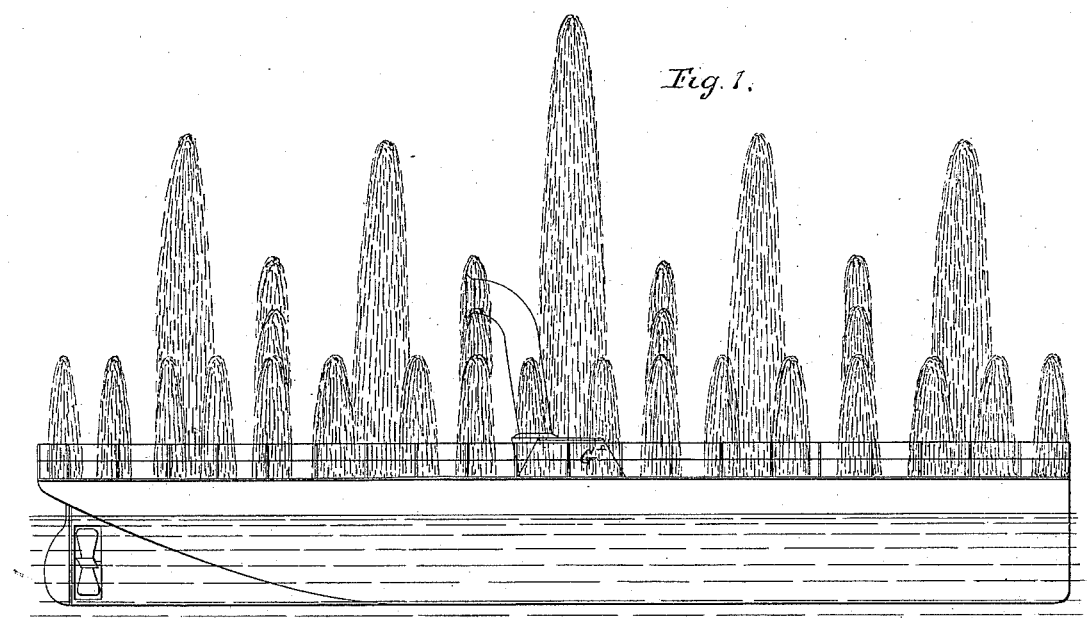
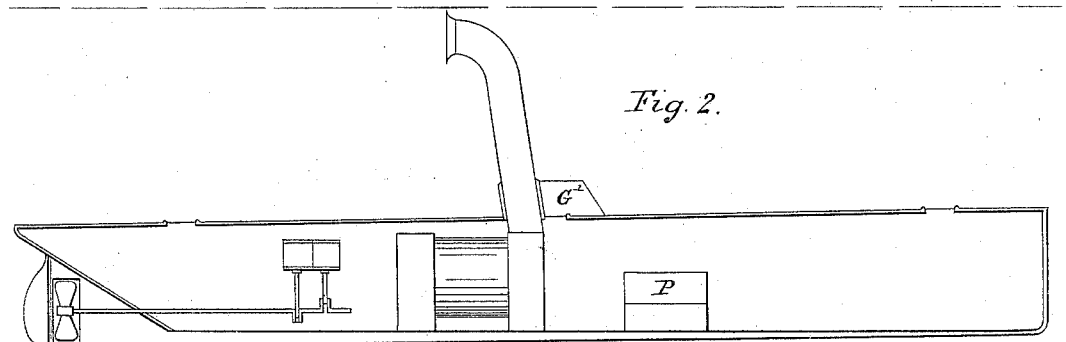
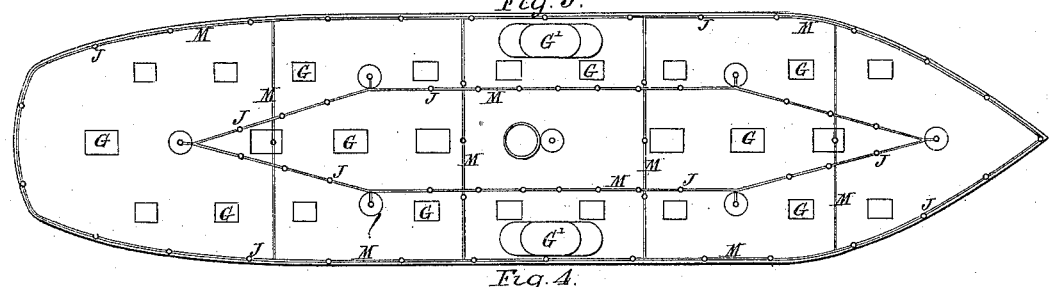
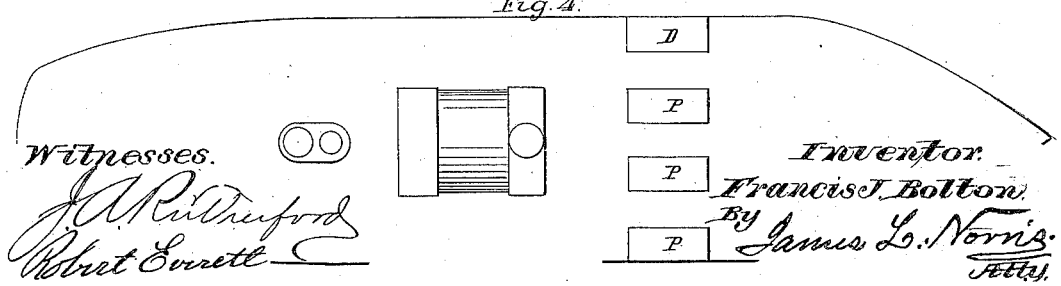
Witnesses.
J. A. Rutherford
Robert Everett
Inventor.
Francis J. Bolton
By James L. Norris
Atty.

(No Model.) 2 Sheets—Sheet 2.
F. J. BOLTON.
FLOATING APPARATUS FOR PRODUCING ILLUMINATED FOUNTAINS.
No. 312,958. Patented Feb. 24, 1885.
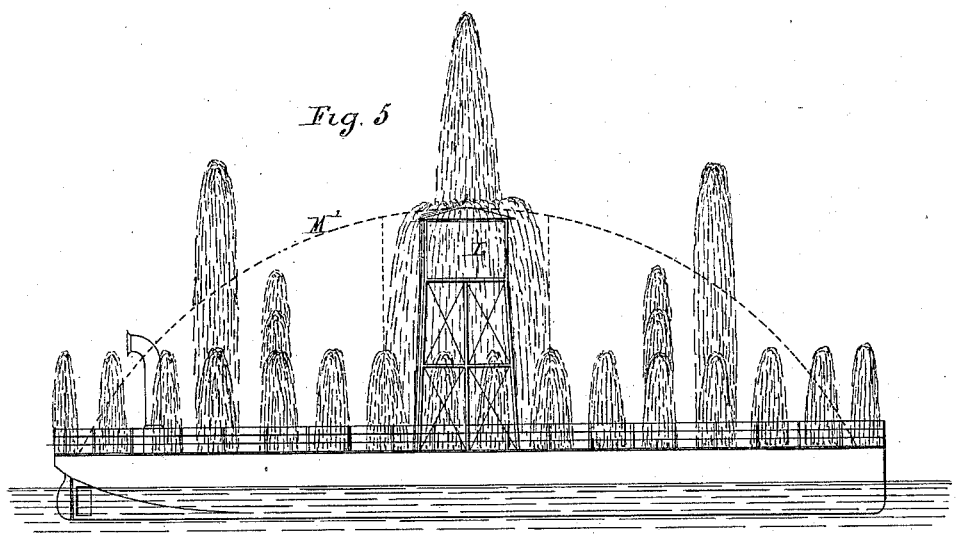
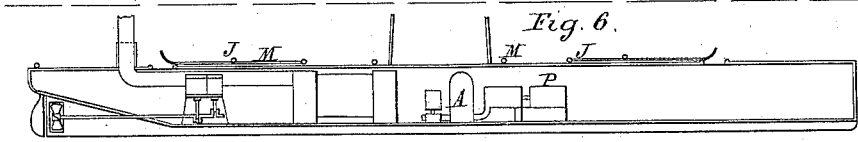
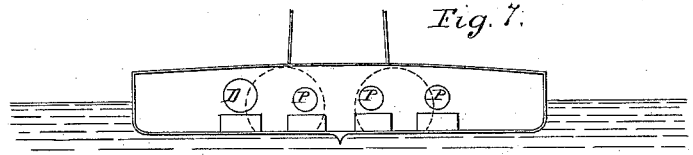
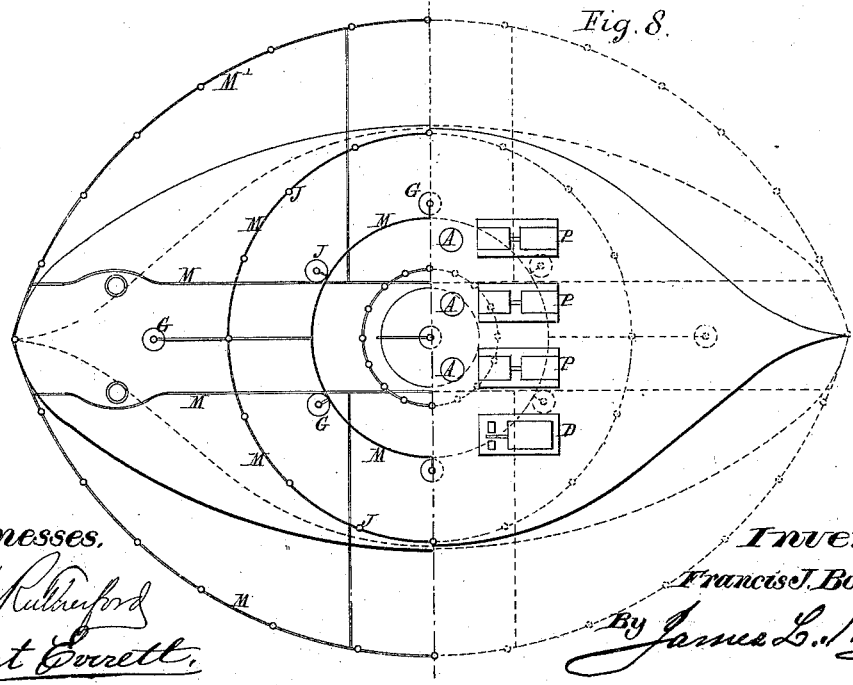
Witnesses,
J. A. Rutherford
Robert Everett
Inventor:
Francis J. Bolton
By James L. Norris
Atty.

United States Patent Office.

FRANCIS JOHN BOLTON, OF WESTMINSTER, COUNTY OF MIDDLESEX, ENGLAND.

FLOATING APPARATUS FOR PRODUCING ILLUMINATED FOUNTAINS.

SPECIFICATION forming part of Letters Patent No. 312,958, dated February 24, 1885.

Application filed November 17, 1884. (No model.) Patented in England August 8, 1884, No. 11,062.

*To all whom it may concern:*

Be it known that I, FRANCIS JOHN BOLTON, knight, a citizen of England, residing at Westminster, in the county of Middlesex, England, have invented Floating Apparatus for Producing Illuminated Fountains, (for which I have made application for a patent in Great Britain, dated August 8, 1884, No. 11,062,) of which the following is a specification.

My invention relates to floating apparatus producing fountains or water-jets which are illuminated by electric or other lights, the apparatus being so arranged that it can be floated from one place to another where displays of such fountains are desired. For this purpose I employ a floating vessel, which may be a vessel of ordinary form, or may be one specially constructed. Under the deck I arrange a set of pumps for forcing the water and illuminating apparatus, which may be lamps, but are preferably electric lights worked from suitable dynamo-machines or other sources of electricity. Above the deck I arrange a number of jet-nozzles communicating with discharge-pipes from the pumps. Through the deck I make apertures and glaze them in a water-tight manner, so that the light from below may shine through, being directed as desired upon the jets by means of reflectors or dioptric or other lenses. Obviously the power and arrangement of the pumping-engines, pumps, dynamo or other electric machines, of the main pipes and their jets, and of the lights may be varied in many ways.

I show by the accompanying drawings as diagrammatic illustrations an arrangement of my apparatus in a vessel of ordinary form and an arrangement in a vessel specially constructed.

Figure 1 is a side view of a vessel of ordinary form with fountains. Fig. 2 is a longitudinal section of the same. Fig. 3 is a plan of the deck, showing the glazed openings, water-mains, and jet-nozzles. Fig. 4 is a plan under the deck. Fig. 5 is a side view of a specially-constructed vessel with fountains. Fig. 6 is a longitudinal section of the same. Fig. 7 is a transverse section. Fig. 8 is a plan, the left half of the deck, the right half under the deck.

Referring to Figs. 1 to 4, inclusive, P are several sets of pumps drawing water from that in which the vessel floats and discharging it by main pipes M through numerous jet-nozzles J.

A dynamo-machine, D, produces electric lights, which shine through the deck-glasses G, illuminating in various ways the jets from the jet-nozzles J. Some of the deck-glasses—such as G'—and the lights for these may be raised above the deck to throw out rays laterally or obliquely.

In arranging the mains M it is important to place them so as to obstruct as little as possible any of the deck-glasses G.

Referring to Figs. 5 to 8, inclusive, D are the dynamo-machines. P are the pumps with air-vessels A. M are the discharge-mains with their jet-nozzles J, and G are the deck-glasses. In this case there is raised above the deck a light-room, L, for illuminating the upper parts of the fountains. The two outer pipes, M', instead of being fixed in position, may be jointed to the mains which supply them, so that when not in use they can be turned up, as indicated by the dotted line M', Fig. 5, and secured to the light-room L.

The fountains may be formed by continuous jets or by jets rendered intermittent by loaded valves arranged in their nozzles or communications, and the jets may be directed vertically or obliquely, or may be of revolving kind, and the various known forms of jets may be combined, as may be desired, for different designs or effects.

Having thus described the nature of my invention, and the best means I know of carrying the same out in practice, I claim—

Floating apparatus for producing illuminated fountains, consisting of a floating vessel provided with pumps, water-mains, and jet-nozzles, and illuminating apparatus sheltered by glass from the water and spray of the jets.

In testimony whereof I have signed my name to this specification, in the presence of two subscribing witnesses, this 30th day of October, A. D. 1884.

FRANCIS JOHN BOLTON.

Witnesses:
JOHN BENJAMIN JONES,
RICHD. LOAM,
4 *The Sanctuary, Westminster.*